United States Patent
Balan et al.

(10) Patent No.: US 6,868,365 B2
(45) Date of Patent: Mar. 15, 2005

(54) OPTIMAL RATIO ESTIMATOR FOR MULTISENSOR SYSTEMS

(75) Inventors: Radu Victor Balan, Levittown, PA (US); Justinian Rosca, Princeton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 6 days.

(21) Appl. No.: 10/435,206

(22) Filed: May 9, 2003

(65) Prior Publication Data

US 2003/0233213 A1 Dec. 18, 2003

Related U.S. Application Data

(62) Division of application No. 09/886,872, filed on Jun. 21, 2001, now Pat. No. 6,577,966.
(60) Provisional application No. 60/213,187, filed on Jun. 21, 2000.

(51) Int. Cl.[7] .............................................. G06F 15/17
(52) U.S. Cl. ....................... 702/180; 702/177; 702/179; 702/183; 702/197
(58) Field of Search ................................. 702/177, 179, 702/180, 182, 183, 189, 76, 77, 79, 176; 324/309; 341/155; 704/233

(56) References Cited

U.S. PATENT DOCUMENTS

| | | | | |
|---|---|---|---|---|
| 5,164,670 A | * | 11/1992 | Szalma et al. ............... | 324/309 |
| 6,026,418 A | * | 2/2000 | Duncan, Jr. ................. | 708/309 |
| 6,215,408 B1 | * | 4/2001 | Leonard et al. ............. | 340/644 |
| 6,371,923 B1 | * | 4/2002 | Roteliuk et al. ............ | 600/526 |
| 6,453,285 B1 | * | 9/2002 | Anderson et al. ........... | 704/210 |
| 6,464,640 B1 | * | 10/2002 | Guracar et al. ............. | 600/453 |
| 6,577,966 B2 | * | 6/2003 | Balan et al. .................. | 702/76 |

* cited by examiner

*Primary Examiner*—Patrick Assouad
*Assistant Examiner*—Felix Suarez
(74) *Attorney, Agent, or Firm*—Donald B. Paschburg; F. Chau & Associates, LLP

(57) ABSTRACT

A signal processing technique can be effectively used for source separation, signal enhancement, and noise reduction when using a twin microphone system. The class of stochastic signals for which ratio-estimates can be computed from histograms is defined. This class fits real-world signals of interest such as voice signals. Theoretical computation in closed form of the optimal estimator for this class of signals is disclosed. Two practical implementation solutions are disclosed, as is a practical solution to exploit an echoic environment model. Furthermore, two novel techniques for signal demixing are presented. The application of the optimal estimator and the suboptimal estimator to the case of more than two channels is disclosed.

8 Claims, 5 Drawing Sheets

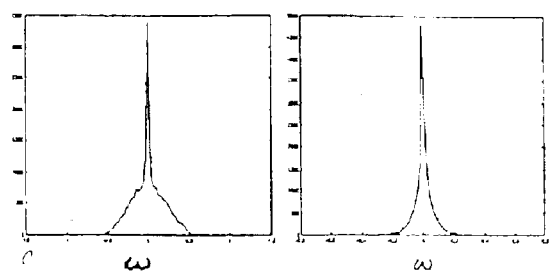
Figure 1: The STFT coefficients histograms for two frequencies ($\omega = 0$ left and $\omega = 15\pi/32$ right)
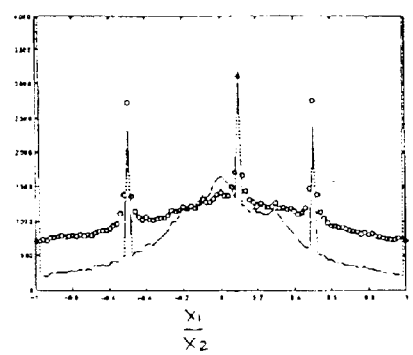
Figure 2: The optima, (dotted line) and DUET (solid line) histograms for a degenerate case (three sources)

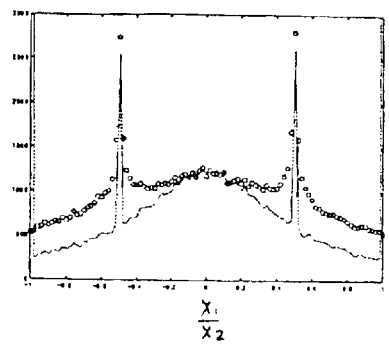
Figure 3: The optimal (dotted line) and DUET (solid line) histograms for two sources (see details in the text)
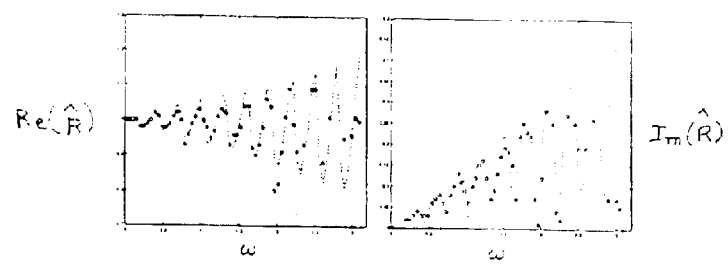
Figure 4: The real (left) and imaginary (right) parts of the estimated ratios (the DUET estimates are the dotted lines).

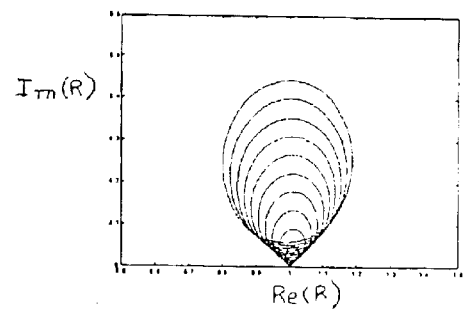
Figure 5: Parametric plot of the ratio for one-echo channel model

OPTIMAL RATIO ESTIMATOR FOR MULTISENSOR SYSTEMS

Reference is hereby made to Provisional Application No. 60/213,187 filed Jun. 21, 2000 in the names of the present inventors, entitled OPTIMAL RATIO-ESTIMATOR FOR MULTI-SENSOR SYSTEMS AND ITS APPLICATIONS TO BLIND SOURCE SEPARATION; this application is also a division of application Ser. No. 09/886,872 filed on Jun. 21, 2001, entitled OPTIMAL RATIO-ESTIMATOR FOR MULTI-SENSOR SYSTEMS now U.S. Pat. No. 6,577,966 and whereof the disclosure is hereby incorporated herein by reference.

The present invention relates generally to an optimal ratio estimator and, more particularly, to an optimal ratio estimator for multi-sensor systems and to applications thereof to blind source separation.

Miniaturized sensors and increased computational power and memory storage in today's digital signal processors make it possible to implement and apply advanced DSP techniques to problems of source separation and noise reduction for small electronic devices such as, for example, speech recognition front ends, personal digital assistants with voice input, mobile phones, smart alarms, etc.). Such devices can take advantage of two or more microphone arrays, and are aimed at improving the directionality of the signal input system, or simply of source separation, while not affecting the quality of the sound, particularly if the sound of interest is speech. In recent years, this domain has been the focus, at the low end of applications, for Blind Source Separation (BSS) and Independent Component Analysis (ICA) Techniques. See, for example, Christian Jutten and Jeanny Herault. Blind separation of sources, part I: An adaptive algorithm based on neuromimetic architecture. *Signal Processing*, 24(1):1–10; 1991; Christian Jutten Pierre Comon and Jeanny Herault. Blind separation of sources, part ii: Problems statement. *Signal Processing*, 24(1):11–20, 1991; Ehud Weinstein, Meir Feder, and Alan Oppenheim. Multi-channel signal separation by decorrelation. IEEE *Trans. On Speech and Audio Processing*, 1(4): 405–413, 1993; and Pierre Comon. Independent component analysis, a new concept? *Signal Processing*; 36(3):287 314, 1994.

Nevertheless, traditionally array processing and beamforming signal processing techniques were principally concerned with the formation of steered beams for an array of sensors in sonar and radar systems. See, for example, Hamid Krim and Mats Viberg. Two decade of array signal processing research. IEEE *Signal Processing Magazine*, 13(4), 1996; and V. Van Veen and Kevin M. Buckley. Beamforming: A versatile approach to spatial filtering. IEEE ASSP Magazine, 5(2), 1988.

It is herein recognized that the ratio of the short time Fourier transform (STFT) coefficients of signals received at two sensors can factor out the role of the power spectrum of emitting sources, under an assumption called disjoint orthogonality. Thus, it can reveal parameters specific to the mixing scenario and serve as a basis for channel estimation techniques.

A signal processing technique is disclosed that can be effectively used for source separation, signal enhancement, and noise reduction when using a twin microphone system. The class of stochastic signals for which ratio-estimates can be computed from histograms is defined. This class fits real-world signals of interest such as voice signals. Theoretical computation in closed form of the optimal estimator for this class of signals is disclosed. Two practical implementation solutions are disclosed as is a practical solution to exploit an echoic environment model. Furthermore, two novel techniques for signal demixing are presented. The application of the optimal estimator and the suboptimal estimator to the case of more than two channels is disclosed.

The invention will be more fully understood from the following detailed description of preferred embodiments, in conjunction with the Drawing, in which FIGS. 1—5 show graphs helpful to gaining a fuller understanding of the invention, where FIG. 1 shows short term Fourier Transform (STFT) coefficients histograms for two frequencies, $\omega=0$ on the left and $\omega=15\pi/32$ on the right;

FIG. 2 shows optimal (dotted line) and DUET (solid line) histograms for a degenerate case (3 sources;

FIG. 3 shows optimal (dotted line) and DUET (solid line) histograms for 2 sources;

FIG. 4 shows the real (left) and imaginary (right) parts of the estimated ratios, with the DUET estimates shown by the dotted lines;

FIG. 5 shows a parametric plot of the ratio for a one-echo channel model.

Figure 6:
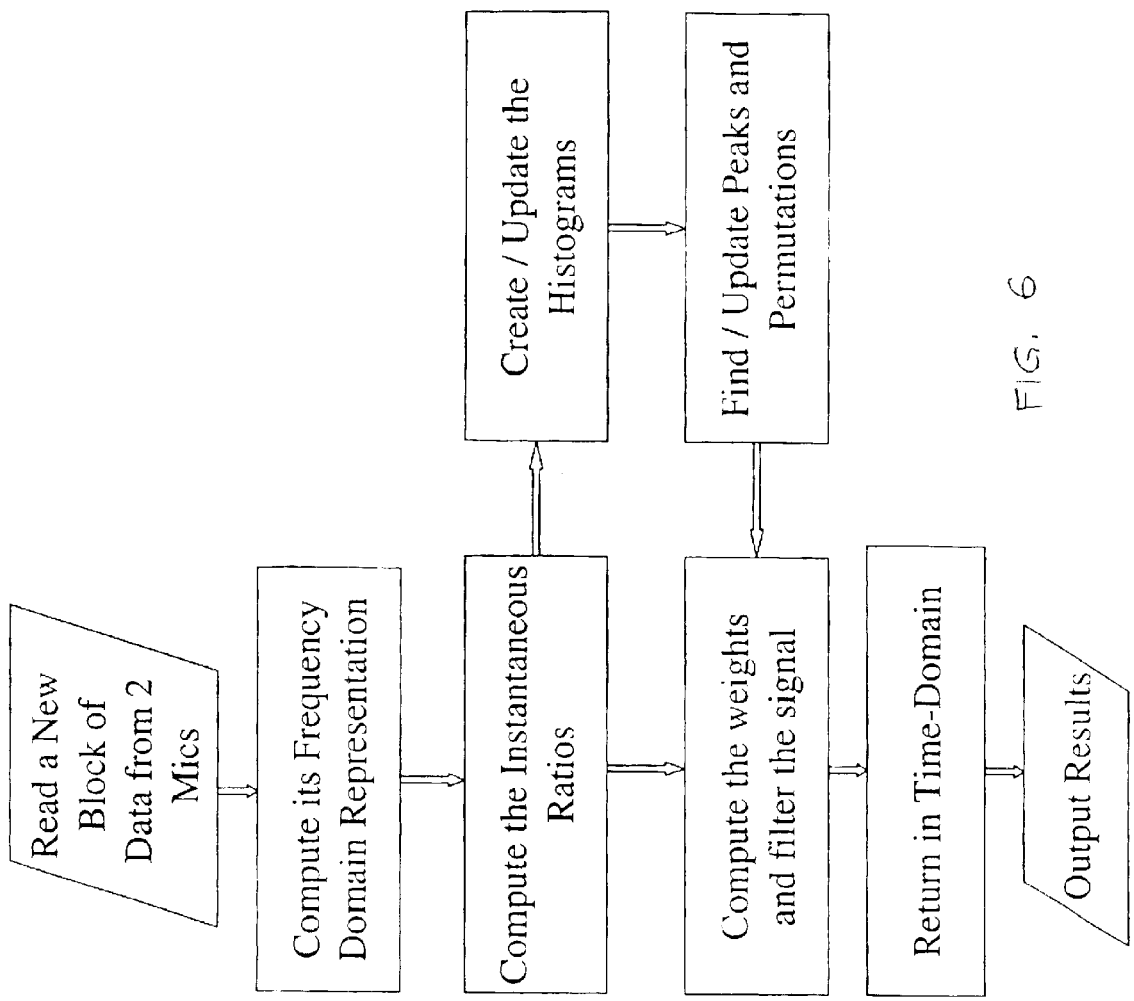
FIGS. 6 and 7 show flow type schematic diagrams helpful to an understanding of the invention.

In accordance with an aspect of the invention, a source separation method based on the use of STFT ratios of two sensor inputs, called DUET (Degenerate Unmixing and Estimation Technique), is hereby extended by the present invention. For DUET, see A. Jourjine; S. Rickard; and O. Yilmaz. Blind separation of disjoint orthogonal signals: Demixing n sources from 2 mixtures. In *Proceedings IEEE International Conference on Acoustics, Speech, and Signal Processing*. IEEE Press, 200. Jun. 5–9, 2000, Istanbul, Turkey. The problem formulation in DUET is herein generalized and it is shown that considerably weaker assumptions about the classes of input signals are sufficient to apply the derived techniques. The analysis centers on the notion of a ratio-estimator and a novel stochastic model that enables derivation of the maximum likelihood ratio-estimator.

It is herein recognized that derived techniques can be effectively applied to source separation, source localization, signal enhancement, and noise reduction when using a twin microphone system, both in echoic environments and degenerate situations. The ratio of the short time Fourier transform (STFT) coefficients of signals received at two sensors can factor out the role of the power spectrum of emitting sources, under an assumption called disjoint orthogonality. Thus, it can reveal parameters specific to the mixing scenario and serve as a basis for channel estimation techniques.

The present analysis defines and analyzes novel signal processing techniques based on STFT ratio statistics that can be effectively applied to source separation, source localization, signal enhancement, and noise reduction when using a twin microphone system. An object of the invention is to find neccessary conditions for classes of signals for which our source separation techniques do indeed work, even in degenerate situations. Such an understanding permits to specifying practical conditions when such techniques work and define their limitations.

In accordance with an aspect of the invention, a source separation method is based on a principle of interpreting STFT ratios of two sensor inputs, which has been proposed in Jourjine et al. op. cit., under the name DUET (Degenerate Unmixing and Estimation Technique).

Considering the problem formulation in DUET (see Section 2), it will hereinafter be shown that weaker assumptions about the classes of input signals combined with an optimal statistical interpretation of the data are sufficient to solve the same problem.

Rather than teach filters to demix data according to some statistical criterion (see, for example, K. Torkkola. Blind separation of convolved sources based on information maximization. In IEEE *Workshop on Neural Networks for Signal Processing*, Kyoto, Japan, 1996), analysis of the present invention centers on the idea of estimating ratios of two transfer functions $H_{1i}/H_{2i}$ (see below), and using these estimates to further infer a parameterized model and demix sources. The mixing herein assumed is the following:

$$x_1(t) = h_{11}*s_1(t) + \ldots + h_{1N}*s_N(t)$$
$$x_2(t) = h_{21}*s_1(t) + \ldots + h_{2N}*s_N(t) \quad (1)$$

where $s_1 \ldots S_N$ are N sources of interest, $x_1$, $x_2$ are the sensor measurements and $h_{11} \ldots h_{2N}$ are the 2N channel formal impulse responses. By formal we mean that fractional delays are allowed. See Tim Laakso, Vesa Valimaki, Matti Karjalainen, and Unto Laine. Splitting the unit delay. IEEE *Signal Processing Magazine*, pages 30 60; 1996.

Besides statistical independence of the sources, two other basic assumptions are made:

Sources are stationary on a short-time horizon, but their frequency content has jumps over long-time periods; and For a given time window, signals may have frequency gaps, but in the long term they cover all the frequency bands (ergodicity or persistence hypothesis).

These qualitative properties will form the basis of a mathematical model for a class of signals of interest. Regarding the channel description, we do not make any assumption at this time. However further into our analysis we apply our technique to both anechoic and echoic mixing models. Although most of this paper is concerned with the two microphone case, we also present extensions of the techniques introduced to the multi-sensor case.

The next section reviews elements of interest about beamforming and degenerate demixing. Thereafter, the principles of the statistical approach, a formalization of the estimation problem, and its consequences in accordance with the present invention will be reviewed. An experimental validation is also included.

A basic principle for singling out a source by beamforming can be used in adaptive algorithms for demixing real-world anechoic and echoic signals. See Justinian Rosca, Joseph O Ruanaidh, Alexander Jourjine, and Scott Rickard. Broadband direction-of-arrival estimation based on second order statistics. In S. A. Solla; T. K. Leen; and K. R. Müller, editors, *Advances in Neural Information Processing Systems* 12, pages 775 781. MIT Press 2000; and Jourjine et al., op. cit.

Of particular interest here is the technique for estimating mixing model parameters Jourjine et al., op. cit., which was applied for degenerate mixtures (more sources than two and two microphones). These principles are reviewed below.

Beam-forming is the problem of processing signals impinging on an array of sensors in order to maximize reception from a given direction. The sonar and radar applications of beamforming principles led directly to an early study of the topic and a rich literature. Hamid Krim et al., op. cit. and V. Van Veen and Kevin M. Buckley. Beamforming: A versatile approach to spatial filtering. IEEE ASSP Magazine, 5(2), 1988. The array response or direction vector can be easily determined for a finite speed of propagation c of a planar wave in a real environment and an equidistant linear array of sensors, spaced by distance One source emitting from direction angle $\theta_i$ is delayed at the next adjacent sensor by $$\delta_i = \frac{d}{c}\cos\theta_i$$

Assuming the source is very far compared to d the effect induced in a K-array is:

$$X(\omega) = S(\omega) \cdot [1 e^{-j\omega\delta_i} \ldots e^{-j\omega(k-1)\delta_i}] \quad (2)$$

where X, S are the Discrete Fourier Transform of the measurements and signal, respectively. The DFTs can be replaced by short-time Fourier transforms, defined as follows. For a source signal s(t), t= . . . , L−1, and a fixed window w, t=0, . . . , M−1(M<L):

$$S(\omega, k) = \sum_{l=k}^{M+k} e^{\frac{2\pi j}{M}\omega} w(l-kb)s(l), k = 0, 1, \ldots, B = \left\lfloor \frac{L}{M} \right\rfloor \quad (3)$$

where b (the time step) is usually a fraction of M, the window size. The ratio b/M represents the redundancy of this representation. If w=1 and b=L=M, one recovers the usual definition of the DFT (Discrete Fourier Transform). In: Radu Balan, Justinian Rosca; Scott Rickard; and Joseph O Ruanaidh. The influence of windowing on time delay estimates. In *Proceedings* CISS 2000, Princeton, N.J., 2000. Princeton, the present inventors analyzed the influence of the window w on the formal manipulations of delays. In essence, it was proved that the windowing effect is negligible. As a result, the window w is fixed in accordance with the present invention to a particular form (for instance the Hanning window).

A linear combination of the measurements at the sensors defines a spatial filter that improves the reception of a narrow band source. Adaptive techniques can discover and focus on one source at a time. This formulation of the problem resulted in a successful BSS approach to real-world broadband (audio) signals using only two closely spaced microphones. See Justinian Rosca, Joseph O Ruanaidh, Alexander Jourjine, and Scott Rickard. Broadband direction-of-arrival estimation based on second order statistics. In S. A. Solla; T. K. Leen; and K. R. Müller, editors, *Advances in Neural Information Processing Systems* 12, pages 775 781. MIT Press 2000.

Frequency domain approaches to the beamforming problem equally allow the recovery of a source of interest from input mixtures. Although such approaches are considered to be computationally intensive, the challenging part is the simultaneous learning of demixing parameters at all frequencies. There is a strong analogy between our approach and frequency domain beamforming in the principle and architecture for signal processing. However the way in which parameters are learnt is radically different.

STFT ratios for two channel systems will next be considered.

A. Jourjine; S. Rickard; and O. Yilmaz. Blind separation of disjoint orthogoal signals: Demixing n sources from 2 mixtures. In *Proceedings IEEE International Conference on Acoustics, Speech, and Signal Processing*. IEEE Press, 200. Jun. 5–9; 2000, Istanbul, Turkey, introduced the DUET technique for blind separation of an arbitrary number of sources from two mixtures of the sources, and claimed that it works under particular assumptions about the sources. In general, the BSS literature makes use of either the statistical independence assumption or the statistical orthogonality assumption. In contrast, DUET introduced an assumption called disjoint orthogonality. By definition, N sources $s_1, s_2, \ldots, s_N$ are disjointly orthogonal if:

$$S_i(\omega) \cdot S_j(\omega) = 0, \forall \omega, \text{ and } \forall i \neq j \tag{4}$$

where these are the DFT transforms of the signals. This means that at most one source has a nonzero Fourier component for any frequency $\omega$. In practice finite windows of data are used, hence the analogous property for windowed Fourier transforms and a fixed windowing function w(t$, called w-disjoint orthogonality, is:

$$S_i(\omega,\tau) \cdot S_j(\omega,\tau) = 0, \forall \omega,\tau, \text{ and } \forall i \neq j \tag{5}$$

Under the disjoint orthogonality assumption, it is follows that at most one of the N sources, let it be $s_i$, for example, will be non-zero for a given frequency $\omega$. In the anechoic model, in the same way as in beam-forming theory for plane waves impinging on two sensors, a source emitting from direction angle $\theta_i$ will be delayed at the second sensor by $$\delta_i = \frac{d}{c} \cos\theta_i$$

and will be possibly attenuated by factor $a_1$. Therefore:

$$X_1(\omega) = S_i(\omega)$$
$$X_2(\omega) = S_i(\omega) \cdot a_i$$
$$\cdot e^{-j\omega\delta_i} \tag{6}$$

The $i^{th}$ source's parameters $a_i$ and $\delta_i$ $a\_\{i\}$$ can be obtained as follows from these relations:

$$a_i = \left|\frac{X_2(\omega)}{X_1(\omega)}\right|, \delta_i = \frac{1}{\omega}\text{Im}\left(\ln\frac{X_1(\omega)}{X_2(\omega)}\right) \tag{7}$$

$$\frac{X_1(\omega)}{X_2(\omega)}$$

is an STFT ratio and the parameters derived from it are herein referred to as ratio-estimates. In theory, DUET can determine all ratio-estimates (parameters $a_i$ and $\delta_i$ in this case) by detecting N peaks of clusters in an amplitude-delay histogram define by the equations above. Then it can obtain estimates of the sources from one mixture only by selecting the corresponding frequencies and transforming back to the time domain.

In practice, the frequencies corresponding to one cluster $\Omega_i$ do not result exactly in the same $\delta_i$. To account for noise and estimation errors, DUET uses an averaging estimate:

$$\hat{\delta}_i = \frac{1}{|\Omega_i|} \sum_{\omega \in \Omega_i} \frac{1}{\omega} \text{Im}\left(\ln\frac{X_1(\omega)}{X_2(\omega)}\right) \tag{8}$$

Even so, DUET can demix surprisingly well a mixture of five speech sources, but estimated sources have serious artifacts. Artifacts increase as the number of sources increases. The disjoint orthogonality assumption may be too strong a condition, which is not satisfied in reality. For one thing, disjoint orthogonality implies statistical orthogonality. Many successful BSS approaches rely, in the NxN case, simply on statistical orthogonality. See Lucas Parra, Clay Spence, and Bert De Vries. Convolutive blind source separation based on multiple decorrelation. In NNSP98, 1988. A question arises to whether the disjoint orthogonality assumption really necessary? The assumption becomes unrealistic especially when more than two sources are mixed together.

It is shown that the disjoint orthogonality assumption is not necessary when applying ratio-estimates of the form given in Equation (7). Mixing model parameters can be estimated using statistical techniques under much broader conditions, which are next defined.

A statistical approach will next be discussed. We generalize ratio-estimates, formally introduce the class of signals for which statistical properties of ratio-estimates are relevant, and derive an optimal ratio-estimator. We claim that ratio-estimates facilitate solutions to the types of BSS applications mentioned.

In reference to a stochastic model for signals of interest, let us consider again the convolutive mixing model. See Equation (1). The transfer functions to the second microphone can be included in the source definitions. After redefinition:

$$x_1(t) = r_{11} * s_1(t) + \ldots + r_{1N} * s_N(t)$$
$$x_2(t) = s_1(t) + \ldots + s_N(t) \tag{9}$$

In the frequency domain, the above equations become:

$$X_1(\omega,k) = R_{11}(\omega)S_1(\omega,k) + \ldots + R_{1N}(\omega)S_N(\omega, k)$$
$$X_2(\omega,k) = S_1(\omega,k) + \ldots + S_N(\omega,k) \tag{10}$$

where $S_1, \ldots S_N, X_1, X_2$ are the source and measurement short-time Fourier transforms. Because windowing effects are negligible (see Radu Balan, Justinian Rosca; Scott Rickard; and Joseph O Ruanaidh. The influence of windowing on time delay estimates. In *Proceedings* CISS 2000, Princeton, N.J., 2000. Princeton), the unknown R coefficients are the same as in the case of the regular Fourier transform, for all practical purposes. R plays the role of a ratio of transfer functions. The problem here is to estimate R.

Rather than simplify the expressions above using the disjoint orthogonality assumption introduced in the previous section, we interpret them from a statistical perspective. In general, sources can use simultaneously the same frequency $\omega_0$. However, many frequencies are available so that there must be cases when sources do not use $\omega_0$ over a short period of time. A statistical analysis of the STFT ratio $$\frac{X_1(\omega)}{X_2(\omega)}$$

should separate the situation when one and only one source uses a particular frequency from the case when none or all use $R_{1i}(\omega_0)$, for some i. The former case enables reliable estimate of the parameters to be made of the source propagation model from data, and therefore ultimately of separate sources. Indeed for those cases when only one source emits at $\omega_0$, $$\frac{X_1(\omega)}{X_2(\omega)}$$

reduces to one of $R_{1i}(\omega_0)$ for some i. At this point a model of source propagation can be used, and its parameters can be estimated or the statistical properties of the ratio can be directly used.

The question arises: is it possible at all to estimate R values reliably given that noise is present and the disjoint orthogonality assumption does not necessarily hold?

At this point, the qualitative statistical assumptions made above are recalled. Sources should be independent, stationary over short-time periods but with discontinuous spectral content over long-time intervals, and be ergodic (or persistent). Now, these hypotheses can be made more precise. A stochastic model that satisfies all these requirements and naturally relaxes the strong w-disjoint orthogonality assumption used in the DUET algorithm is constructed.

Short-term stationarity is recast into an assumption of independence of the short-time frequency components. Thus, for every fixed k, $S(\omega_1, k)$ is independent of $S(\omega_1, k)$ for $\omega_1 \neq \omega_2$. Note that this would be formally true if samples were jointly Gaussian.

Next, we model the discontinuous behavior of the spectral power as a product of two random variables: a continuous (or quasi-continuous, i.e. a discretized continuous) random variable, denoted by G, and a Bernoulli random variable V with probability p of being 1 and (1−p) of being 0. This is a crucial assumption of the model in accordance with the principles of the invention. Experimental data will be hereinafter presented in support the stochastic model in accordance with the present nvention. The intuition behind it comes from the time-frequency representation of the speech. In the time-frequency (TF) plane, speech forms various ridge patterns. Consider that for a fixed frequency, one sees a nonzero spectral power on that frequency channel for a given time-frame. The energy pulse may go on into the next time frame, branch into adjacent frequency bands, or simply disappear. Such a behavior suggests modeling the TF components $S(\omega,k)$ as a product of two random variables (RV):

$$S(\omega,k) = V^{\omega,k} G^{\omega,k} \quad (11)$$

where V is a Bernoulli RV or switching process and G is a continous RV. For the present description, it is herein considered that the spectral components are independent for different time frame indices. Thus, in fact, it is assumed that $S(\omega_1, k_1)$ is independent of $S(\omega_2, k_2)$ for every $(\omega_1, k_1 \neq \omega_2, k_2)$. For speech signals this hypothesis can be relaxed to accommodate, for instance, a hidden Markov model. Finally the ergodicity (or persistence) hypothesis allows us to assume that for every frequency $\omega$, $V(\omega)$ is of non-vanishing variance. This assumption is by no means essential to the algorithms in accordance with the invention, and in fact in several applications the frequency is tuned set on a particular signal of interest. However this hypothesis is made to avoid degenerate cases. The stochastic model in accordance with the invention is summarized below:

Signal Class: The class of signals of interest is formed by those stochastic signals whose short-time Fourier transform is factorized as a product of a discrete Bernoulli RV and a continuous (or quasi-continuous) RV as in Equation 11.

In defining an Optimal ML Ratio-Estimator, a principal goal is to define an optimal estimator for R using the stochastic model introduced before. Consider the two-source case for which the mixing model (10) turns into:

$$X_1(\omega,k) = R_1(\omega) V_1^{\omega,k} G_1^{\omega,k} + R_2(\omega) V_2^{\omega,k} G_2^{\omega,k}$$

$$X_2(\omega,k) = V_1^{\omega,k} G_1^{\omega,k} + V_2^{\omega,k} G_2^{\omega,k} \quad (12)$$

For the remainder of the present subsection a frequency $\omega$ is fixed and we it writing it. For this model the following assumptions are made:

(1) $V_1, V_2$ are Bernoulli random variables with probabilities of success p1, p2 respectively;

(2) $G_1, G_2$ are discrete random variables, uniformly distributed over a sufficiently large set of equispaced points (say $K_1, K_2$);

(3) $V_1^k, V_2^k, G_1^k, G_2^k$, are i.i.d. copies of the random variables $V_i$ and $G_i$.

A problem is to estimate $R_1$ and $R_2$ based on B block data measurements $X_1(1) \ldots, X_1(B)$ and $X_2(1) \ldots, X_2(B)$.

We compute the maximum likelihood estimator for $R_1, R_2$ by conditioning with respect to $V_1^k, V_2^k V_1$. At every block k:

$$Pr(X_1(k), X_2(k) \mid R_1, R_2) = \quad (12a)$$

$$\sum_{a,b \in \{0,1\}} Pr(X_1(k), X_2(k) \mid R_1, R_2, V_1^k = a, V_2^k = b) Pr_{V_1}(a) Pr_{V_2}(b)$$

Thus for the likelihood we obtain:

$$Pr(X_1, X_2 \mid R_1, R_2) = \quad (12b)$$

$$\prod_{k=1}^{B} [(1-p_1)(1-p_2) \cdot Pr(X_1(k)=0, X_2(k)=0) +$$

$$p_1(1-p_2) \cdot Pr(X_1(k)=R_1 G_1^k, X_2(k)=G_1^k \mid R_1) +$$

$$(1-p_1)p_2 \cdot Pr(X_1(k)=R_2 G_2^k, X_2(k)=G_2^k \mid R_2) +$$

$$p_1 p_2 \cdot Pr(X_1(k)=R_1 G_1^k + R_2 G_2^k, X_2(k)=G_1^k + G_2^k \mid R_1, R_2)]$$

where $X_1, X_2$ are B-vectors of complex numbers. Note that the middle term probabilities can be written as:

$$Pr(X_1(k) = R_1 G_1^k,$$

$$X_2(k) = G_1^k \mid R_1) =$$

$$\delta(X_1(k) = R_1 X_2$$

$$(k)) \cdot P_{G_1}$$

$$(X_2(k)) \quad (12c)$$

$$Pr(X_1(k) = R_2 G_2^k, X_2$$

$$(k) = G_2^k \mid R_2) = \delta(X_1$$

$$(k) = R_2 X_2(k)) \cdot P_{G_2}$$

$$(X_2(k)) \quad (12d)$$

where $\delta(\ )$ is the Kronecker symbol. Note that $X_1, X_2$ can take values only on a discrete lattice. The lattice structure has the following consequences:

Lemma 1.

For nonzero $R_1 \neq R_2$, the following implications hold true for the events (a),(b), and (c) defined below:

(a) $X_1(k) = 0$ & $X_2$ $(k) = 0 \Rightarrow X_1(k) = R_1 X_2$ $(k)$ & $X_1(k) = R_2 X_2(k)$ (b) $X_1(k) \neq 0$ or $X_2(k) \neq 0$)

& $X_1(k) = R_1 X_2$ $(k) \Rightarrow X_1(k) \neq R_2 X_2(k)$ (c) $X_1(k) \neq 0$ or $X_2(k) \neq 0$)

& $X_1(k) = R_2 X_2$ $(k) \Rightarrow X_1(k) \neq R_1 X_2$ $(k) \quad (12e)$

Lemma 2.

Events (a),(b), and (c) are mutually exclusive.

Lemma 3.

The set $\{1 \ldots, B\}$ can be disjointly partitioned into four sets $T_1, T_2, T_3, T_4$ as determined by events (a),(b), and (c).

$$T1=\{i\epsilon\{1,\ldots,B\}|(a)\text{ is true}\}$$

$$T2=\{i\epsilon\{1,\ldots,B\}|(b)\text{ is true}\}$$

$$T3=\{i\epsilon\{1,\ldots,B\}|(c)\text{ is true}\}$$

$$T4=\{i\epsilon\{1,\ldots,B\}|(a)\text{ and (b) and (c) are false}\} \quad (12f)$$

Now, we can prove our main result:

Theorem. For uniformly distributed $G_i$ the likelihood $Pr(X_1, X_2|R_1, R_2)$ has the form:

$$Pr(X_1, X_2|R_1, R_2) = \qquad (12g)$$

$$\left[(1-p_1)(1-p_2) + \frac{p_1(1-p_2)}{K_1} + \frac{p_2(1-p_1)}{K_2} + \frac{p_1 p_2}{K_1 K_2}\right]^{|T_1|} \cdot$$

$$\left[\frac{p_1(1-p_2)}{K_1} + \frac{p_1 p_2}{K_1 K_2}\right]^{|T_2|} \cdot \left[\frac{p_2(1-p_1)}{K_2} + \frac{p_1 p_2}{K_1 K_2}\right]^{|T_3|} \cdot$$

$$\left[\frac{p_1 p_2}{K_1 K_2}\right]^{|T_4|} = \left[\frac{p_1 p_2}{K_1 K_2}\right]^B \cdot [1+E_1]^{|T_1|} \cdot [1+E_2]^{|T_2|} \cdot [1+E_3]^{|T_3|}$$

where $|T_1|$ denotes the cardinality of the set $T_1$.

Proof. In the expression of $Pr(X_1 X_2|R_1, R_2)$ the product $$\prod_{k=1}^{B}$$

is split into four sub-products according to which one of the four sets T (Corrollary 2) i belongs.

Note that $E_1, E_2, E_3$ and $|T_1|$ do not depend on $R_1, R_2$, but rather on the prior information. Also $p_1,, p_2,, K_1,, K_2$ depend on the actual measurements while $|T_2|,|T_3|$ are the only quantities that depend on $R_1, R_2$. Thus, maximizing the likelihood turns into maximizing simultaneously $|T_2|$ and $|T_3|$, or equivalently, maximizing the number of times events (b) and (c) are true. Therefore, the components of the optimal R-estimator, $\hat{R}_1, \hat{R}_2$ are the solutions of:

$$(\hat{R}_1, \hat{R}_2) = argmax_R \|X_1 - RX_2\|^0 \qquad (13)$$

where the 0-norm means the number of "hits" (i.e. number of cases when $X_1-RX_2=0$). For more than two sources, the additional R's satisfy the same relation, with argmax interpreted as selecting local maxima. The number of local maxima correspond to the number of sources present.

Implementation of the optimal R-estimator is discussed next.

R-estimates can be obtained by finding the complex R values for every $\omega$ and chaining the values together across all frequencies into $R_1(\omega), R_2(\omega), \ldots, R_n(\omega)$, after appropriate permutations. Below we discuss how: (1) R's are obtained for a particular frequency $\omega$; (2) n is determined from the data at various frequencies; and (3) R-estimates are assembled together.

First we address the estimation of R's. Equation 13 can be directly implemented using a histogramming method, as given by the following formula:

$$N_{opt}(R,\omega)=|\{k, |X_1(\omega,k)-RX_2(\omega,k)|<\delta\}| \qquad (14)$$

The optimal estimator is obtained as:

$$\hat{R}_{opt}(\omega)=argmax_R N_{opt}(R,\omega)$$

where argmax has the same local maxima interpretation as before.

An approximation of Equation 14 (and therefore suboptimal formula) is obtained further by making explicit the ratio $$\frac{X_1(\omega,k)}{X_2(\omega,k)}$$

$$N'(R,\omega) = \left|\left\{k, \left|\frac{X_1(\omega,k)}{X_2(\omega,k)} - R\right| < \delta\right\}\right| \qquad (15)$$

and the R-estimate is constructed similarly to the optimal case, as:

$$\hat{R}'(\omega)=argmax_R N'(R,\omega) \qquad (15a)$$

Note the suboptimal equation above is asymptotically optimal when $\delta \to 0$. Parameter $\delta$ corresponds to the bin size used in the computation of histograms $$\frac{X_1(\omega,k)}{X_2(\omega,k)}$$

for every $\omega$. The determination of local optima naturally corresponds to the highest peaks in the histograms.

Secondly, we return to the question of assessing the number of sources n. The solution in accordance with the present invention is to select histograms (and, therefore, frequencies) with high confidence peaks. Confidence depends on the height and mass of the peak areas. A reference frequency $\omega_{ref\_}$ is finally obtained, defined as follows: (1) It belongs to a range given by prior knowledge about the type of signals, for instance, 500 Hz to 4 kHz in the case of voice signals; and (2) The minimum distance between acceptable peaks found is the largest among all frequencies considered. The number of peaks for $\omega_{ref\_}$ gives n.

Thirdly, we discuss the way histogram peaks (i.e. R-values) are associated together across all frequencies. For every frequency $\omega$, we consider n histogram peaks and label them $R_{1,2,\ldots,n}(\omega)=\{R_1(\omega),\ldots,R_n(\omega)\}$. The question is to find a permutation $\pi$ of the set $1,2,\ldots,n$ such that sources for $R_\pi(\omega)$ are in the same order as in $R_{1,2,\ldots,n}(\omega_{ref})$. The optimum permutation $\pi_{oopt}(\omega)$ is given by:

$$\pi_{opt}(\omega) = argmax_\pi \sum_{j=1}^{n} \left|\left\{k, \left|\frac{X_1(\omega,k)}{X_2(\omega,k)} - \pi(j)(\omega)\right| < \delta \text{ and }\right.\right. \qquad (16)$$

$$\left.\left.\left|\frac{X_1(\omega_{ref},k)}{X_2(\omega_{ref},k)} - R_j(\omega_{ref})\right| < \delta\right\}\right|$$

Real signals, particularly voice signals can be approximately modeled using our model. Although the discreteness assumption regarding the sources is not valid, for real speech signals the two estimators defined above gave similar results. In conclusion, the suboptimal histogram based estimator is a good estimator for real speech signals, even in the degenerate case of three sources.

Next, the modelling of echoic environments in the context of the present invention is discussed.

Imposing a signal mixing model (such as far field and echoic) helps the estimation problem. It is herein shown how this is done when modeling the environment as an echoic environment of order one (i.e. using only the first indirect path).

Assuming that only one source is present, and the distance d between sensors is very small (e.g. microphones are close).

Microphone proximity implies that the delays we deal with are fractional. The direct path delays are less than one sample. In the far-field approximation, the transfer functions will have the following form:

$$H_{11}(\omega) = K(1 + a_1 e^{-i\tau_1 \omega}$$
$$+ \ldots + a_n e^{-i\tau_n \omega})$$
$$H_{21}(\omega) = e^{-i\tau \omega}(1+$$
$$a_1 e^{-i(\tau_1 + \delta_1)\omega}$$
$$+ \ldots + a_n e^{-i(\tau_n + \delta_n)\omega}) \quad (17)$$

where $|\tau_1|, |\delta_1| \ldots |\delta_n| < 1, a_1 \ldots, a_n < 1$ are the echo attenuations and $\tau_1 \ldots, \tau_n$ are the echo arrival times.

For n=1 we have an echoic approximation of order one. The model has five parameters in this case: $K, \tau, \tau_1, \delta_1$, and $a_1$. Estimation of parameters enables us to demix signals by complex matrix inversion and computation with fractional delays in the two by two problem. It turns out that parameters can be estimated reliably by identification based on SDFT ratios as discussed.

The main steps of the procedure are:
Compute SDFT ratios $R(\omega, k)$;
Estimate $\hat{R}(\omega, k)$ for each histogram peak;
Determine permutation for assembling R-estimates together;
Identify parameters of the environment model for R's above;
Recompute R$-estimates based on the model; and
Recover independent signals by signal demixing (see next subsection).

Anechoic estimates can be obtained as a particular case of the echoic results, when the echoic model is simplified with $a_1 = 0$. FIR models for $H_1 1$ and $H_2 1$ can also be used.

Next, signal demixing is considered.

In the case of two sources, source estimates are obtained using the adjunct of the inverse of the estimated mixing matrix.

The direct method for signal estimation based on R-estimates in the general case of n sources comprises:
Partitioning of the complex plane by a Voronoi tesselation on the set of points $R_{1,2,\ldots,n}$
Spectral weighting of mixtures in the frequency domain, with the characteristic function of each Voronoi set item Inversion of STFT signals obtained by spectral weighting.

A generalization of the algebraic approach in the degenerate case of more sources than sensors is Wiener filtering, as described below. It requires additional information about the variances of the sources, or a separate estimation process with this goal.

Let us consider the case n=3. Assuming that the variances $v_i$, i=1,2,3, are determined, then an estimate of source i is:

$$\hat{S}_i = \tilde{H}_{1i} X_1 + \tilde{H}_{2i} X_2 \quad (17a)$$

where:

$$\tilde{H}_{1i} = (v_1 + v_2 + v_3)(\bar{R}_1 v_1 \delta_{1i} + \bar{R}_2 v_2 \delta_{2i} + \bar{R}_3 v_3 \delta_{3i}) - \quad (18)$$
$$(\bar{R}_1 v_1 + \bar{R}_2 v_2 + \bar{R}_3 v_3)(v_1 \delta_{1i} + v_2 \delta_{2i} + v_3 \delta_{3i})$$
$$\tilde{H}_{2i} = -(R_1 v_1 + R_2 v_2 + R_3 v_3)(\bar{R}_1 v_1 \delta_{1i} + \bar{R}_2 v_2 \delta_{2i} + \bar{R}_3 v_3 \delta_{3i}) +$$
$$(R_1 \bar{R}_1 v_1 + R_2 \bar{R}_2 v_2 + R_3 \bar{R}_3 v_3)(v_1 \delta_{1i} + v_2 \delta_{2i} + v_3 \delta_{3i})$$

and $\delta_{ij}$ is the Kronecker symbol.

The following section treats the generalization of the estimation approach for more microphones.

The analysis of the case of more sources and two microphones is similar. The ratio histograms will exhibit more local maxima, one peak for each source. Thus the R-estimation problems reduces to finding the peaks of a histogram. The problem becomes more challenging if more sensors are used. Under the deterministic w-disjoint orthogonality no acceptable answer has been found. A solution there would be to pair the microphones and then to somehow average the estimates. Using the stochastic model in accordance with the present invention, a similar computation can be done for the likelihood function. For the three-sensors case, the mixing model is:

$$X_1^k = R_{11} V_1^k G_1^k + R_{12} V_2^k G_2^k$$
$$+ R_{13} V_3^k G_3^k$$
$$X_2^k = R_{21} V_1^k G_1^k + R_{22} V_2^k G_2^k$$
$$+ R_{23} V_3^k G_3^k$$
$$X_3^k = V_1^k G_1^k + V_2^k G_2^k + V_3^k G_3^k \quad (19)$$

Assuming the Bernoulli RVs $V\_1, V\_2, V\_3$ have respective probabilities $p_1, p_2, p_3 \to 1$ $ close to one, we obtain:

$$P(X_1, X_2, X_3|R) = \text{const} \cdot (1 + E_1)^{|T_1|}$$
$$(1 + E_2)^{|T_2|}(1 + E_3)^{|T_3|} \quad (20)$$

where $$T_a = \left\{ k, \left| X_3^k - \frac{X_1^k(R_{2c} - R_{2b})}{R_{1b}R_{2c} - R_{1c}R_{2b}} - \frac{X_2^k(R_{1b} - R_{1c})}{R_{1b}R_{2c} - R_{1c}R_{2b}} \right| < \delta \right\} \quad (21)$$

ith (a,b,c) a circular permutation of (1,2,3). Defining $$A_a^1 = \frac{R_{2c} - R_{2b}}{R_{1b}R_{2c} - R_{1c}R_{2b}} \text{ and } A_a^2 = \frac{R_{1b} - R_{1c}}{R_{1b}R_{2c} - R_{1c}R_{2b}}$$

and noticing that $\{R_{1a}, R_{2a}, a=1,2,3\}$ is bijectively mapped onto $\{A_a^1, A_a^2; a=1,2,3\}$ except for some singularities, it follows that we can first estimate A's parameters and then recover R's. Thus, the optimal estimator is given by the first three optimizers of:

$$(\hat{A}_a^1, \hat{A}_a^2) = \text{argmax}_{A_a^1, A_a^2} |\{k, |X_3^k - A_a^1 X_1^k - A_a^2 X_2^k| < \delta\}| \quad (22)$$

If each A is discretized into k bins, the total computationalt cost would be $5Bk^2$. Alternatively, inspired by the ratio estimator in the two-sensor case, a suboptimal estimator can be derived as follows: the sets $T_1, T_2, T_3$ above are the sets when only one source is zero on the particular frequency $\omega$. The probability of this happening is about $p^2(1-p)$, much bigger than $p(1-p)^2$, the probability of two sources to be zero. Thus the ratios histogram would have smaller peaks and these peaks would be more difficult to detect. Instead, let us consider the histograms of $$\frac{X_{1-z_1} X_3}{X_{2-z_2} X_3}$$

for several values of $z_1$ $z_2$. In general these histograms would exhibit a number of peaks of small amplitude, unless $z_1$ and $z_2$ are exactly $R_{1a}, R_{1b}$ for some a. In this case, the contribution of source a is canceled and the ratios histogram would exhibit two big peaks (of amplitude of order p(1−p)). These peaks should be respectively at $$\frac{R_{1b} - R_{1a}}{R_{2b} - R_{2a}} \text{ and } \frac{R_{1c} - R_{1a}}{R_{2c} - R_{2a}}$$

with (a, b, c) a permutation of (1,2,3). This estimator requires the same $5Bk^2$ operations, as the optimal estimator.

A number of tests to show that the model captures real data well.

First, the stochastic model in accordance with the invention was checked. See Equation (11) For this about 18.6 seconds of voice (with natural pauses) was utilized at a sampling frequency of F=8000 Hz and the STFT coefficients were computed over windows of length $M=64$. FIG. 1 shows a plot of the histograms of their real parts when the number of bins is 100. Note the peaks around zero. This is consistent with the superposition formula $Pr=(1-p)P_1 + p*\delta()$ which would represent the p.d.f. of a product VG between a Bernoulli and a continuous random variable. Next we plot the histograms (see Equation (14)) of the ratio $X_1/X_2$ for two and three sources of type (see Equation (11)) where V's are Bernoulli (p) and G's are uniformly distributed on [−2, 2]. For $R_1=-0.5$, $R_2=0.5$, $R_3=-0.1$ and p=0.85, we obtained the histograms shown in FIG. 2. Even though p is close to 1, the peaks can be very well estimated (the smaller the probability p, the higher the peaks). FIG. 3 shows the histogram obtained in the non-degenerate case of two sources, from 100000 samples, $R_1=-0.5$, $R_2=0.5$ and p=0.98. G was normally distributed N(0, 1).

Finally we examine an echoic environment with one echo (as in Equation (17)) for two three second TIMIT voices.

A source's true complex ratio is drawn with solid line in FIG. 4. Using the ratio histogram estimator we obtained the estimates drawn with dotted lines in the same figure. For each frequency we estimated the two peaks in the histogram, and then we decided how to assign the values based on a continuity property. With the exception of a few frequencies, the estimates are close to the ideal curves. The ratio-estimates obtained from these peaks (i.e. the estimated mixing model parameters) were very close to the true values. FIG. 5 presents a parametric plot of the ratio of transfer functions for a one-echo channel model corresponding to the solid line in FIG. 4. The parameters of the model in this case were K=1, n=1, $a_1$=0.3, $\tau_1$=21, $\tau$=0.1 and $\delta_1$=0.2.

Figure 7:
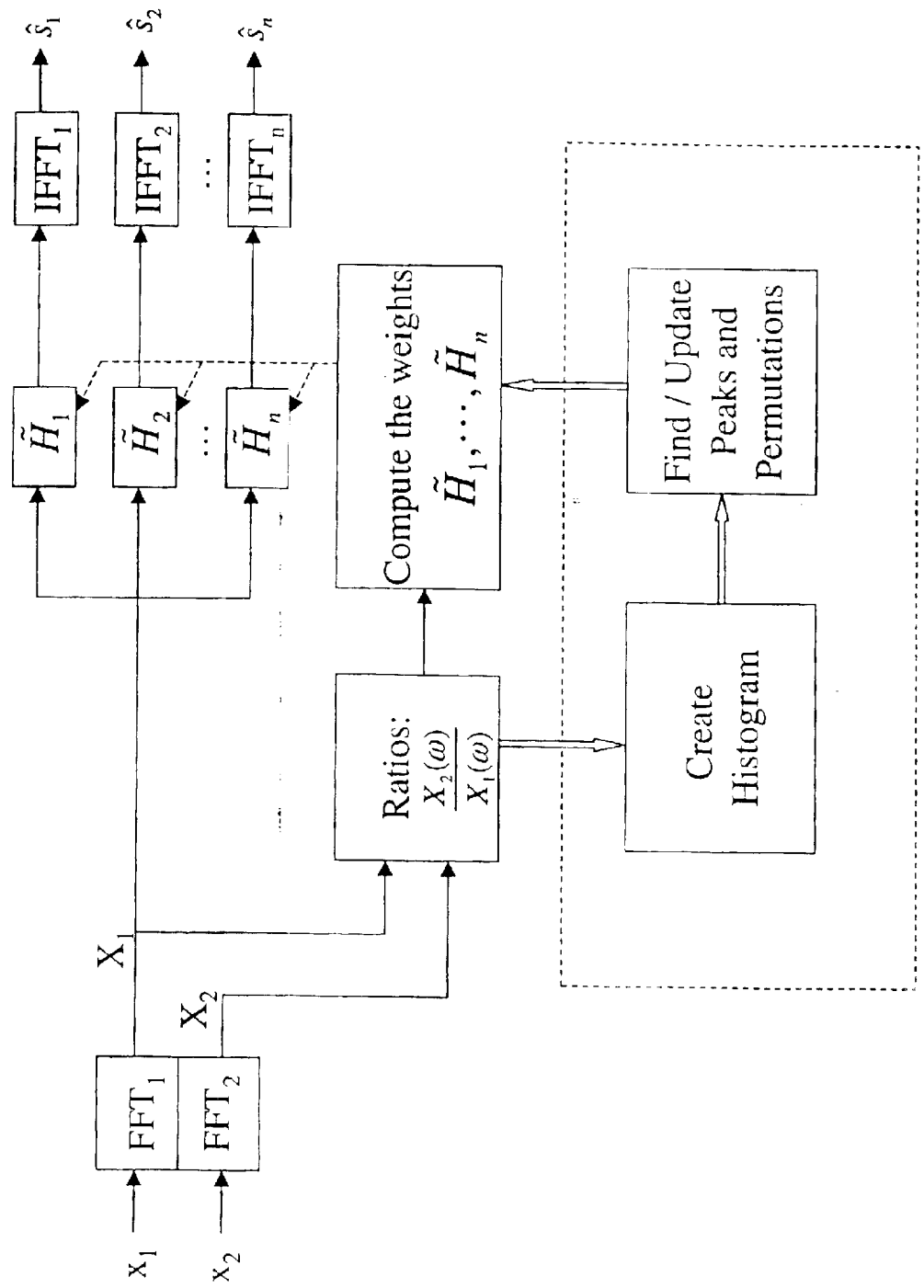

FIGS. 6 and 7 show schematic process or flow block diagrams representing an implementation of the demixing scheme in accordance with the principles of the invention.

Basic steps are:
1. Read data and transform into frequency domain $x_1(t) \rightarrow X_1(\omega), x_2(t) \rightarrow X_2(\omega)$;
2. Compute the instantaneous ratios $$\frac{X_2(\omega)}{X_1(\omega)};$$

3. Compute the weights for each frequency and each source: $\tilde{H}_k(\omega)$ or $\tilde{H}_{1k}$, $\tilde{H}_2 k$;
4. Filter the data: $\hat{S}_k = \tilde{H}_k X_1$ (first, or direct method), or $\hat{S}_k = \tilde{H}_{1k} X_1 + \tilde{H}_{2k} X_2$ (Wiener filter–equation (18));
5. Return in time-domain: $\hat{S}_k(\omega) \rightarrow \hat{s}_k(t)$.

FIG. 6 shows only the first method of unmixing, that is, using a single channel. In order to compute the weights, we need the location of the peaks corresponding to each source, at each frequency. This is achieved in two different blocks, that parallel steps 2 and 3:

2a: Create/Update Histograms; and
3a: Find/Update Peaks and Permutations
See FIG. 7.

The ratio, that is, the peak location and correct assignment, estimation procedure represents one aspect of the present invention. It is noted that both the peak location and the permutation problems have long been a problem in the art. The foregoing steps enumrated above can be done either off-line, or on-line. In an exemplary off-line implementation, at each frequency the histogram is created based on the entire batch of data, then the peaks are searched and found, and next the right indexing source-peak is done (i.e. the permutation problem is solved). In an exemplary on-line implementation, the histograms and peaks are updated adaptively with every block of data and, if needed, the permutations are changed.

A second novel aspect herein disclosed is the demixing technique based on the Voronoi regions of the complex plane, at each frequency. The present description also provides a justification of the mixing model as disclosed in Justinian Rosca, Joseph O Ruanaidh, Alexander Jourjine, and Scott Rickard. Broadband direction-of-arrival estimation based on second order statistics. In S. A. Solla; T. K. Leen; and K. R. Müller, editors, *Advances in Neural Information Processing Systems* 12, pages 775 781. MIT Press 2000; and in K. Torkkola. Blind separation of convolved sources based on information maximization. In *IEEE Workshop on Neural Networks for Signal Processing*, Kyoto, Japan, 1996.

The ratio estimator in accordance with the invention herein disclosed is optimal in the sense of maximum likelihood under the stochastic assumtions we made; even if the true statistics are different, the estimators still give good results.

The foregoing description has disclosed, inter alia, the following;
defined the class of stochastic signals for which ratio-estimates can be computed from histograms; shown that this class fits real-world signals of interest such as voice signals; the computation in closed form the optimal estimator for this class of signals; extended the optimal estimator and the DUET suboptimal estimator to the case of more than two channels; and defined identification resolution bounds, and bounds on the number of sources in order to be able to separate sources using ratio-estimate techniques.

While the invention has also been described by way of exemplary embodiments, it will be understood that various changes and modifications may be made thereto without departing from the spirit and scope of the invention which is defined by the claims following.

What is claimed is:

1. Apparatus for ratio estimation comprising:
   first and second microphone transducers for providing respective signal data from first and second mobile phone microphone transducers;
   means for transforming said respective signal data into respective frequency domain representations;
   means for computing instantaneous ratios between said respective frequency domain representations;
   means for creating respective histograms of said instantaneous ratios;
   means for finding and updating peaks and permutations in said respective histograms;

means for computing weight data for individual frequency components of said respective frequency domain representations by utilizing said peaks and permutations in said respective histograms;

means for optionally filtering said weight data to derive optionally filtered weight data;

means for transforming said optionally filtered weight data into a time-domain representation; and means for outputting said time-domain representation.

2. Apparatus for ratio estimation comprising:

first and second microphone transducers for providing respective signal data from said first and second microphone transducers;

means for transforming said respective signal data into respective frequency domain representations;

means for computing instantaneous ratios between said respective frequency domain representations;

means for creating respective histograms of said instantaneous ratios;

means for finding and updating peaks and permutations in said respective histograms;

means for computing weight data for individual frequency components of said respective frequency domain representations by utilizing said peaks and permutations in said respective histograms;

means for optionally filtering said weight data to derive optionally filtered weight data;

means for transforming said optionally filtered weight data into a time-domain representation; and means for outputting said time-domain representation to a respective mobile phone transducer.

3. A method of modeling echoic environments, comprising:

computing SDFT ratios $R(\bar{\omega},k)$;

estimating $\hat{R}(\bar{\omega},k)$ for each histogram peak;

determining permutation for assembling R-estimates together;

identify parameters of the environment model for $R(\bar{\omega},k)$;

recomputing R-estimates based on the parameters; and recovering independent signals by signal demixing.

4. The method of claim 3, wherein determining permutation for assembling R-estimates together is given by $$\pi_{opt} = \text{argmax}_\pi \sum_{j=1}^{n} \left\{ \left( k, \left| \frac{X_1(\varpi, k)}{X_2(\varpi, k)} - R_{\pi(j)(\varpi)} \right| < \partial \text{ and } \left| \frac{X_1(\varpi_{ref}, k)}{X_2(\varpi_{ref}, k)} - R_j(\varpi_{ref}) \right| < \partial \right) \right\}.$$

5. The method of claim 3, wherein recovering independent signals by signal demixing comprises:

partitioning of a complex plan by a Voronoi tessellation on the set of points $R_{1,2,\ldots,n}$;

spectral weighting of mixtures in the frequency domain, with the characteristic function of each Voronoi set; and inverting of STFT signals obtained by spectral weighting.

6. A method of ratio estimation comprising the steps of:

deriving respective signal data from two sources;

transforming said respective signal data into respective frequency domain $x_1(t) \rightarrow X_1(\bar{\omega}), x_2(t) \rightarrow X_2(\bar{\omega})$;

computing the instantaneous ratios $$\frac{X_2(\varpi)}{X_1(\varpi)}$$

between said respective frequency domain representations;

computing the weights for individual frequency components of said respective frequency domain representations: $\tilde{H}_k(\omega)$ or $\tilde{H}_{1k}, \tilde{H}_{2k}$;

optionally filtering said weight data to derive optionally filtered weight data;

transforming said optionally filtered weight data into a time-domain representation: $\hat{S}_k(\bar{\omega}) \rightarrow \hat{s}_k(t)$; and outputting said time-domain representation.

7. The method of claim 6, wherein optionally filtering said weight data comprises filtering data using the direct method: $\hat{S}_k = \tilde{H}_k X_1$.

8. The method of claim 6, wherein optionally filtering said weight data comprises filtering data using the Wiener filtering method:

$$\hat{S}_k = \tilde{H}_{1k} X_1 + \tilde{H}_{2k} X_2$$

where $\tilde{H}_{1k} = (v_1 + v_2 + v_3)(\bar{R}_1 v_1 \partial_{1k}$ $+ \bar{R}_2 v_2 \partial_{2k} + \bar{R}_3 v_3 \partial_{3k}) -$ $(\bar{R}_1 v_1 + \bar{R}_2 v_2 + \bar{R}_3 v_3)$ $(v_1 \partial_{1k} + v_2 \partial_{2k} + v_3 \partial_{3k})$ and $\tilde{H}_{2k} = -(R_1 v_1 + R_2 v_2 + R_3 v_3)$ $(\bar{R}_1 v_1 \partial_{1k} + \bar{R}_2 v_2 \partial_{2k} + \bar{R}_3 v_3 \partial_{3k}) +$ $(R_1 \bar{R}_1 v_1 + R_2 \bar{R}_2 v_2 + R_3 \bar{R}_3 v_3)$ $(v_1 \partial_{1k} + v_2 \partial_{2k} + v_3 \partial_{3k})$.

* * * * *